United States Patent

Fitzgerald

[15] 3,641,770
[45] Feb. 15, 1972

[54] FLOATING OIL CONFINING APPARATUS

[72] Inventor: Hugh J. Fitzgerald, Austin, Tex.
[73] Assignee: Ocean Pollution Control, Inc., Dallas, Tex.
[22] Filed: June 25, 1969
[21] Appl. No.: 836,545

[52] U.S. Cl. ................................61/1, 138/111, 210/242
[51] Int. Cl. ................E02b 15/04, F16l 39/02, B01d 17/02
[58] Field of Search ....................61/1, 5; 138/111, 117, 128, 138/155, 157, 158, 159, 160; 210/121, 242

[56] References Cited

UNITED STATES PATENTS

| | | | |
|---|---|---|---|
| 2,682,151 | 6/1954 | Simpson | 61/1 |
| 3,221,884 | 12/1965 | Muller | 61/1 X |
| 3,389,559 | 6/1968 | Logan | 61/1 |
| 3,476,246 | 11/1969 | Dahan | 61/1 X |
| 3,503,214 | 3/1970 | Desty et al. | 61/1 F |

FOREIGN PATENTS OR APPLICATIONS

| | | | |
|---|---|---|---|
| 10,654 | 1845 | Great Britain | 138/159 |
| 817,113 | 1959 | Great Britain | 138/128 |

Primary Examiner—Jacob Shapiro
Attorney—Richards, Harris & Hubbard

[57] ABSTRACT

Apparatus for confining and removing oily material on the surface of a body of water consisting of a polygonal ring formed by flexible tubular float members inflated to a pressure on the order of 0.5 p.s.i., with a weighted skirt depending therefrom, and with a transfer pipe having its inlet end removably supported in the leeward corner of the ring at a level within the thickness of the oily accumulation.

3 Claims, 4 Drawing Figures

PATENTED FEB 15 1972
3,641,770
FIG.1
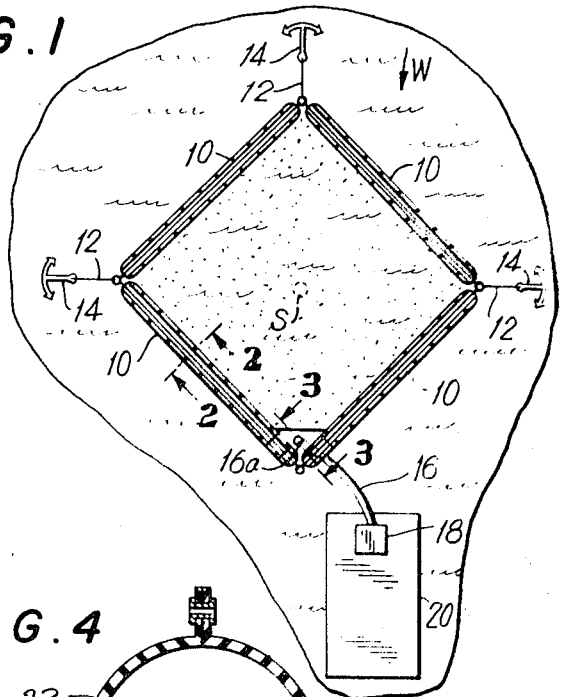
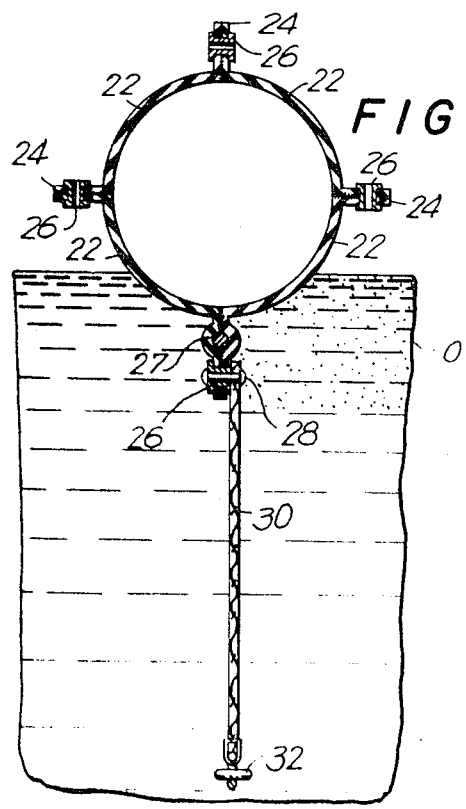
FIG.2
FIG.4
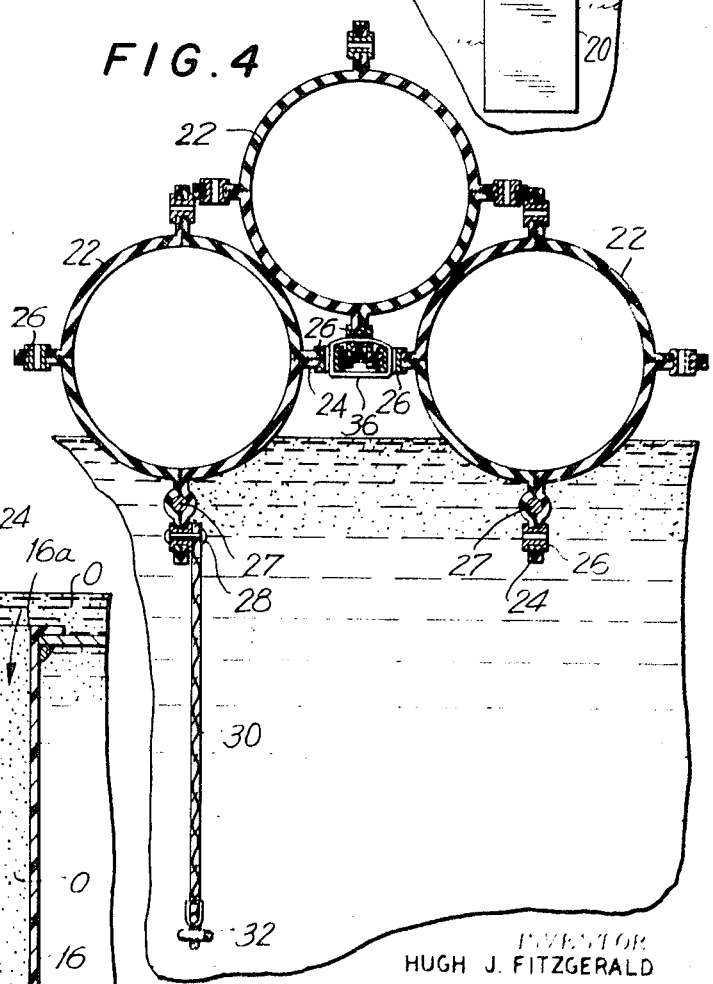
FIG.3
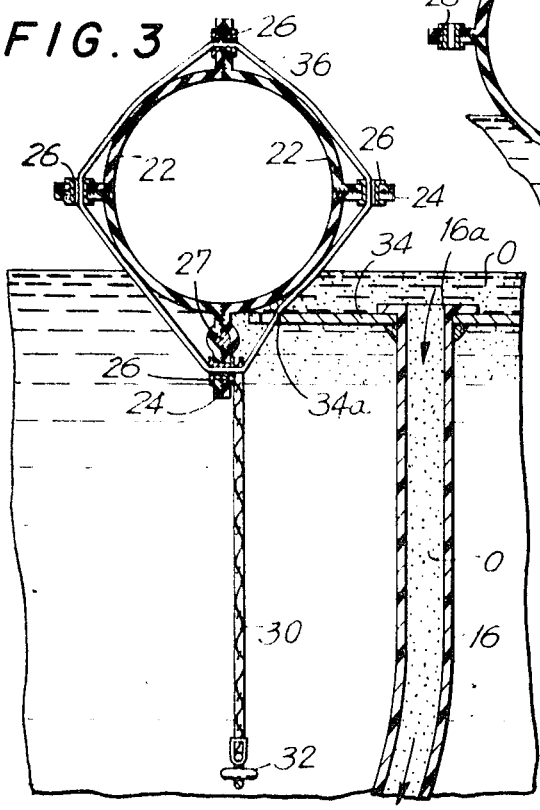
INVENTOR
HUGH J. FITZGERALD
BY
Curtis, Morris & Safford
ATTORNEYS

FLOATING OIL CONFINING APPARATUS

This invention relates to apparatus for confining an oily material on the surface of a body of water and removing the resulting accumulation.

It is well known that when oil is released in or on a large body of water, because of the immiscibility of oil with water and the fact that oil is lighter than water, the oil rises to the surface of the water in the form of a film or slick which spreads to cover a large area and which is capable of migrating considerable distances depending upon the wind and the current. Where large quantities of oil are released, for example due to the sinking or damage of an oil tanker or to escape of oil under pressure through a fissure in an otherwise impermeable formation overlying an oil reservoir or adjacent to the borehole of an offshore drilling operation, movement of the oil slick to adjacent coastal areas can not only form an unsightly and messy residue on beaches, interfering with their recreational uses, but also have serious effects on aquatic birds, fish and other marine life, as well as other adverse ecological consequences.

Heretofore there has been no effective means for confining and/or removing large oil films from open bodies of water. Attempts to use detergents and other chemicals to emulsify and/or disperse the oil have for the most part proven ineffective. On the other hand, attempts to confine the oil to a limited area to prevent its dispersion, for example by a chain of logs or elongated floats connected end to end in a circle, or to skim the oil from the surface by towing means such as chain of floats between a pair of tugboats moving on parallel courses, have proved virtually worthless due to the fact that the surface of an ocean, bay or large inland lake is almost invariably subject to waves or choppiness which cause the oil film to be washed over the tops of the rigid floats so that most of the oil escapes.

The present invention provides a practical, effective and inexpensive apparatus for confining an oily material to a limited area of the surface of the water, thereby preventing its spreading or migration, and for removing the resulting accumulation. In general terms, this is accomplished by elongated flexible, hollow, tubular float members, which are inflated to low pressure, on the order of 0.5 p.s.i., to maintain a high degree of flexibility, and which are connected end to end in a ring which surrounds an area of substantial width around the source of the oily material. Depending from the float members are skirts of impermeable sheet material weighted at the lower ends, for example by a chain, and extending downwardly a distance exceeding the anticipated maximum thickness of the oily accumulation. The ring is preferably generally polygonal—for example, roughly square—in shape, with each corner on the windward side connected to an anchor to keep the ring spread and to prevent its drifting due to wind and current. The flexibility of the ring allows it to conform closely to the wave motion and chop of the surface and thus prevent escape of the oily accumulation either over the tops of the float members or under the bottom of the skirt. A transfer pipe is supported within the ring, preferably at the leeward corner, with the inlet end of the pipe at a level within the thickness of the oily accumulation. The pipe extends to a pump, for example on a storage barge anchored adjacent but outside the ring, to remove the oily material as it accumulates.

In the drawing:

FIG. 1 is a diagrammatic plan view of an illustrative apparatus embodying features of the present invention.

FIG. 2 is a cross-sectional view, at greatly enlarged scale, taken on the line 2—2 of FIG. 1.

FIG. 3 is a cross-sectional view, at the same scale as FIG. 2, taken on the line 3—3 of FIG. 1.

FIG. 4 is a view similar to FIG. 2 but showing a modification in which three float members are stacked in a pyramidal arrangement.

The illustrative apparatus shown in FIG. 1 is in the form of a ring which is roughly square in shape, having four sides formed by elongated, hollow, flexible, tubular float members 10 with their ends connected to the proximate ends of the adjacent float members. The ring floats on the surface, enclosing a wide area around the source S of the oily material. The ring is preferably oriented so that one corner is at the leeward side of the prevailing wind, as indicated by the arrow W. The ring is kept spread and prevented from drifting by attachment of the three corners on the windward side of the ring to lines 12 extending from anchors 14 on the bottom of the body of water. In the leeward corner is supported the input end 16a of a flexible pipe 16 which extends to a pump 18 on a storage barge 20 located adjacent but outside of the ring.

FIG. 2 shows a typical cross section through one of the tubular float members 10. As may be seen, each of these members 10 may be formed of a plurality of—for example, four—segments 22, each of which extend lengthwise of the elongated tubular member around a portion of its circumference. The segments are formed of flexible, impermeable sheet material, such as nylon fabric or other strong textile material, impregnated with or laminated to neoprene, rubber or similar plastic material. The proximate ends of the adjacent segments are adjoined by marginal portions which are bonded face to face, for example by cementing, heat sealing or vulcanization, to form radially outwardly extending flanges 24. These flanges 24 are provided with holes—preferably reinforced, for example by grommets 26—for convenience in attaching the float members to one another and to ancillary parts of the apparatus.

The lower flange 24 preferably encloses an integral cable or rope 27 formed, for example of nylon or similar material, which is provided at each end with a projecting loop or other means of attaching the float members together and for transmitting the tensile forces, imposed either by wave action or by towing to or from the point of use, without straining and possibly tearing the float members.

Attached to the bottom edge of the lower flange 24, for example by boltlike fasteners 28 extending through the grommets 26, or by lacing a line through the aligned grommets, is a depending skirt 30 which is formed of a flexible, impermeable sheet material, for example the same type of material used in fabricating the float members, although possibly of lighter gauge. Secured adjacent the lower edge of the skirt 30 is a chain 32 which weights the edge of the skirt to insure that it extends generally vertically downwardly, without impairing its flexibility. The width of the skirt exceeds the anticipated maximum thickness of the oily accumulation to prevent the oily material from escaping beneath the bottom edge of the skirt. The skirt 30 may suitably be made integral with the float member 10, for example by merely extending the marginal portion of one of the lower segments 22. However, forming it of a separate sheet, removably attached to the float member, as shown, allows it to be replaced readily in the event of damage, or in the event a deeper skirt is desired, for example, because of rough seas.

The bouyancy and flexibility of this assembly is such that the ring will float lightly upon the surface, conforming readily to its rapidly undulating and fluctuating contour and effectively entrapping the oily accumulation, which will build up on the surface within the ring, as indicated at 0. As shown in FIG. 3, in the leeward corner of the ring, the pipe 16 is supported on a web 34 formed, for example of a heavy but flexible fabric material, extending obliquely across the corner, with its opposite ends secured to the float members 10, for example by bands 36 encircling the float members through the grommets and extending through holes 34a in the ends of the web 34. The input end 16a of the pipe 16 is open above the web 34 and is supported at a level slightly below the upper surface of the oily accumulation 0, so that the liquid entering the pipe 16 will consist essentially of the oily material, with little if any water.

In the event of a shift in the wind direction, so that a different corner of the ring becomes its leeward corner, the transfer pipe 16 may readily be moved to that corner by merely disconnecting and reconnecting the bands 36 and moving the storage barge 20.

FIG. 4 shows an illustrative modification which may be used in very heavy or choppy seas. In this modification, three of the tubular float members 10 are stacked in a triangular pyramid arrangement, with the two lower float members and the upper float members lashed together by lines 36 laced through the grommets in the adjacent flanges 24 at the center of the stack. The skirt 30 is preferably connected to the outer float member in the lower row, so that oily material which passes downwardly between the float members will be trapped inside the skirt. The pyramid arrangement may, of course, be used only on the leeward sides of the ring. Near the leeward apex of the ring, where the oily accumulation is thickest, even higher stacks can be made, for example a pyramidal arrangement of six float members, with three on the bottom row, two in the middle row, and one on top.

Each float member is equipped with a valve, for example a valve of the type used in an automobile inner tube or tubeless tire. When the float members are evacuated, they may be collapsed generally flat and coiled on a reel, in the fashion of a firehose. They may thus be stored compactly or transported conveniently to the location where they are needed. They may be readily uncoiled and inflated with air, for example by a compressor. They are preferably inflated to a pressure not substantially in excess of 1 p.s.i., for example about 0.5 p.s.i., to maintain the desired high degree of flexibility.

I claim:

1. In an apparatus for confining an oily material on the surface of a body of water which apparatus includes a plurality of inflated, elongated, flexible tubular members adapted to be joined to each other in a parallel manner, the improvement which comprises:

each of said tubular members having a plurality of flange members extending radially outwardly from the surface thereof, the flange members extending longitudinally along the surface of the tubular members to permit a flange member on one of said tubular members to be arranged in an abutting relationship with a flange member of another tubular member; and means for affixing said flange members in an abutting relationship to thereby join said tubular members in a parallel manner.

2. The apparatus of claim 1, wherein each of the flange members on said tubular members is spaced about 90° from another of said flange members to permit a plurality of said tubular members to be joined in a parallel and pyramidal manner.

3. The apparatus of claim 2, wherein each of said tubular members is provided with four flange members and said apparatus includes:

an elongated load-bearing member disposed longitudinally along and affixed to the tubular member.

* * * * *